United States Patent
Early et al.

(10) Patent No.: US 12,188,513 B2
(45) Date of Patent: Jan. 7, 2025

(54) FASTENER SEALS

(71) Applicants: Built Environments, Inc., Oakdale, MN (US); Sustant, LLC, Lake Elmo, MN (US)

(72) Inventors: Jonathan C. Early, Lake Elmo, MN (US); M. Steven Doggett, Oakdale, MN (US); Robert Jantschek, Lake Elmo, MN (US)

(73) Assignees: Sustant, LLC, Lake Elmo, MN (US); Built Environments, Inc., Oakdale, MN (US)

( * ) Notice: Subject to any disclaimer, the term of this patent is extended or adjusted under 35 U.S.C. 154(b) by 296 days.

(21) Appl. No.: 17/739,984

(22) Filed: May 9, 2022

(65) Prior Publication Data
US 2023/0349416 A1    Nov. 2, 2023

Related U.S. Application Data (60) Provisional application No. 63/337,026, filed on Apr. 29, 2022.

(51) Int. Cl.
*F16B 43/00*    (2006.01)
*C09J 7/20*    (2018.01)
*C09J 7/40*    (2018.01)

(52) U.S. Cl.
CPC .............. *F16B 43/001* (2013.01); *C09J 7/20* (2018.01); *C09J 7/40* (2018.01); *C09J 2203/346* (2020.08);
(Continued)

(58) Field of Classification Search
CPC .... F16B 43/001; C09J 7/20; C09J 7/40; C09J 2203/346; C09J 2301/122; C09J 2301/302
See application file for complete search history.

(56) References Cited

U.S. PATENT DOCUMENTS

| | | | |
|---|---|---|---|
| 2,833,327 | A | 5/1958 | Donovan |
| 4,842,938 | A | 6/1989 | Rizk et al. |

(Continued)

FOREIGN PATENT DOCUMENTS

| | | | |
|---|---|---|---|
| GB | 2437535 | A | 10/2007 |
| JP | 2003176699 | A | 6/2003 |

(Continued)

OTHER PUBLICATIONS

CRC—"Repair Patch: Waterproof, -40° to 392° F Temp. Range, 50 min Full Cure, 6 in × 9 in"—Downloaded Jun. 20, 2022—Available from Internet <URL: https://www.grainger.com/product/48XY77?>.

(Continued)

*Primary Examiner* — Patricia L. Nordmeyer
(74) *Attorney, Agent, or Firm* — Gallium Law; Wesley Schwie; Justin Schwechter (57) ABSTRACT

The present disclosure describes systems and techniques for sealing over fasteners coupled to exterior building enclosures, including discrete adhesive patches, as well as various dispenser systems thereof. In some examples, a system includes a system for sealing over fastener heads coupled to one or more building enclosure layers, the system comprising an elongated release liner wrapped into a cylindrical roll. In some examples, the system includes a plurality of circular fastener patches distributed longitudinally along the release liner, each fastener patch comprising. According to some embodiments, the plurality of circular fastener patches includes a conformable air-tight and water-tight film layer. The plurality of circular fastener patches may include a pressure-sensitive and hydrophobic adhesive layer disposed between the film layer and the release liner.

20 Claims, 8 Drawing Sheets

(52) U.S. Cl.
CPC .... *C09J 2301/122* (2020.08); *C09J 2301/302* (2020.08)

(56) References Cited

U.S. PATENT DOCUMENTS

| | | | |
|---|---|---|---|
| 4,923,348 A * | 5/1990 | Carlozzo | F16B 37/14 |
| | | | 52/515 |
| 4,959,251 A | 9/1990 | Owens et al. | |
| 5,204,148 A | 4/1993 | Alexander et al. | |
| 5,419,666 A | 5/1995 | Best | |
| 5,513,769 A | 5/1996 | Baets | |
| 5,629,065 A | 5/1997 | Schinabeck | |
| 5,643,648 A | 7/1997 | Kobe et al. | |
| 5,755,908 A | 5/1998 | Rayburn et al. | |
| 6,071,833 A | 6/2000 | D'Alisa et al. | |
| 6,086,972 A | 7/2000 | Rayburn | |
| 7,624,760 B2 | 12/2009 | Monk et al. | |
| 9,528,005 B1 | 12/2016 | Miriani et al. | |
| 10,138,919 B2 * | 11/2018 | Mathieson | E04D 1/34 |
| 10,259,008 B1 | 4/2019 | Swift et al. | |
| 11,130,297 B2 | 9/2021 | Wolfe | |
| 2003/0044563 A1 | 3/2003 | Kocinec et al. | |
| 2007/0199276 A1 | 8/2007 | Duque | |
| 2008/0116087 A1 | 5/2008 | Hathaway | |
| 2011/0083391 A1 | 4/2011 | Thomas | |
| 2011/0177331 A1 * | 7/2011 | Mosher | B32B 15/08 |
| | | | 428/354 |
| 2020/0164599 A1 | 5/2020 | Swift | |
| 2021/0178429 A1 | 6/2021 | Swift | |

FOREIGN PATENT DOCUMENTS

| | | |
|---|---|---|
| KR | 102054235 B1 | 12/2019 |
| WO | 2008137000 A2 | 11/2008 |

OTHER PUBLICATIONS

Flex Seal—"Duct Tape: Rubber, Black, 2 cu ft Container, Wood/Concrete/Metal, 2 PK"—Downloaded Jun. 20, 2022—Available from Internet <URL: https://www.grainger.com/product/55KJ95>.

Gorilla—"Duct Tape: Gorilla, Heavy Duty, 1 in × 10 yd, Black, Continuous Roll, Pack Qty: 1"—Downloaded Jun. 20, 2022—Available from Internet <URL: https://www.grainger.com/product/16V093>.

Super Glue—"Fiberglass Patch: 3 × 6 in Patch, -40 Degrees to 350 Degrees F Temp. Range, Yellow"—Downloaded Jun. 20, 2022—Available from Internet <URL: https://www.grainger.com/product/1FBH3>.

* cited by examiner

FASTENER SEALS

BACKGROUND

Field

The present disclosure relates to construction, particularly for exterior building enclosures, otherwise known as building envelopes.

Description of Related Art

Homes, offices, and other buildings can include one or more exterior surfaces or enclosure layers to protect framed wall assemblies and interior structures (e.g., wood frame) from weather damage and leakage. For instance, enclosure layers often include cladding, rainscreen drainage space, exterior insulations, Air and Water Barriers (AWB), sheathing, and the framed wall cavity. The sequence of these enclosure layers may vary by design preferences. The sheathing layer might require a drainage plane to manage water until it can evaporate.

During construction, an AWB layer, also known as a Water-Resistive Barrier (WRB), is typically coupled to other enclosure components, framed assembly, and interior structure via fasteners, such as metal nails, tacks, screws, or the like. However, the perforation surrounding each fastener presents a breach in the AWB, allowing air and water to penetrate the structure over time. Accordingly, the perimeter of these fasteners requires an additional barrier element, such as a length of tape or liquid adhesive, both of which are cumbersome to install and are therefore prone to installation errors and accelerated degradation.

SUMMARY

The present disclosure describes systems and techniques for sealing over fasteners coupled to exterior building enclosures, including discrete adhesive patches, as well as various dispenser systems thereof.

In some examples, a system includes a system for sealing over fastener heads coupled to one or more building enclosure layers, the system comprising an elongated release liner wrapped into a cylindrical roll. In some examples, the system includes a plurality of circular fastener patches distributed longitudinally along the release liner. According to some examples, the plurality of circular fastener patches includes at least two layers. A first fastener patch layer may be a conformable air-tight and water-tight film layer. In some examples, a second fastener patch layer may be a pressure-sensitive and hydrophobic adhesive layer disposed between the film layer and the release liner.

In some examples, the film layer is selected from the group consisting of a topical film, a solid film, and a coatable film. According to some examples, the coatable film comprises a fabric matrix configured to receive a liquid coating. The fabric may comprise a substance selected from the group consisting of a fleece and a felt, wherein the felt comprises a fiber selected from the group consisting of natural fibers and synthetic fibers. In some examples, the coating is selected from the group comprising acrylic, silicone, and silane-modified polyether.

According to some examples, the film layer comprises a coated or uncoated hybrid film. The film layer may be selected from the group consisting of a high-density polypropylene, polyethylene, polyolefin, a polyethylene fabric a polyester fabric, and a combination of a solid and a fleece, wherein the fabric comprises a substance selected from the group consisting of fleece and felt, and wherein the felt comprises a fiber selected from the group consisting of natural fibers and synthetic fibers. In some examples, the film layer defines an outer circumferential edge defining a predetermined thickness configured to enable tactile separation from the release liner.

According to some examples, an outer surface of the patch comprises an indicator configured to facilitate positioning of the patch over the fastener head. The indicator may comprise a debossment from the outer surface. In some examples, the outer surface of the patch is debossed, and wherein the indicator comprises an embossment. According to some examples, the patch is configured to self-seal in response to receiving a puncture.

The adhesive layer may define a predetermined thickness based on a type of the one or more building enclosure layers. In some examples, a type of the one or more building enclosure layers is selected from the group consisting of a sheathing panel, a structural insulation sheathing panel, a plywood panel, an oriented strand board (OSB) panel, a Magnesium-Oxide panel, an integrated Air-and-Water barrier panel, an integrated water-resistive sheathing panel, a sheet membrane, a building coating layer, a tape, a flashing, a coated or uncoated glass-mat facer, an insulation layer, a concrete surface, an above-grade wall, a below-grade wall, a roofing surface, and a fenestration element.

According to some examples, the adhesive layer defines a minimum peel strength of about 10 pounds-per-inch. The release liner may be selected from the group consisting of a siliconized paper layer and a plastic film.

In some examples, the patch further comprises a thermal-insulation layer. According to some examples, the thermal-insulation layer is selected from the group consisting of a microsphere coating, a foam matrix, or an adhesive matrix having thermal conductivities significantly lower than an underlying fastener. The circular patch may define a diameter between about 0.5 inches and about 4 inches. In some examples, the adhesive layer comprises an adhesive selected from the group consisting of an acrylic, a hot melt, a butyl, and a butyl hybrid.

According to some examples, the system for sealing over fastener heads coupled to one or more building enclosure layers further comprises a dispensing tool coupled to the roll. The dispensing tool may comprise a handle and a strip-trimmer.

In examples including an indicator, a shape of the indicator may be selected from the group consisting of a plurality of circular rings mutually arranged into a larger circular ring pattern, an iris-type pattern resembling a focusing lens of a digital camera, a plurality of "plus" symbols generally arranged into a square shape, a plurality of at least partially overlapping circular rings arranged into a larger circular ring, a plurality of right-angle shapes arranged into two nested square shapes oriented at about 45 degrees relative to one another, a plurality of heptagonal shapes mutually arranged into a larger circular ring, a plurality of hexagons mutually arranged into three distinct honeycomb-type patterns, a plurality of hexagons mutually arranged into a honeycomb-type pattern, a plurality of hexagons and a plurality of squares arranged in an alternating pattern so as to define a larger circular ring shape, a flower-type shape defining a central ring and a plurality of flower-petal shapes extending radially outward therefrom, an interlocking plurality of hexagons, an abstract indicator pattern comprised of a plurality of elongated, irregularly shaped lines, an interlocking plurality of angled shapes, each angled shape defining an angle of about 120 degrees, a plurality of non-overlapping circular rings or dots, and a plurality of non-overlapping twelve-sided geometric shapes arranged and connected so as to define a plurality of squares and hexagons therebetween.

The disclosure also includes a method of forming a circular fastener patch configured to seal over a fastener head coupled to a building enclosure. In some examples, the method of forming a circular fastener patch configured to seal over a fastener head coupled to a building enclosure includes coating a pressure-sensitive and hydrophobic adhesive layer onto an underside of a conformable air-tight and water-tight film layer. According to some examples, the method of forming a circular fastener patch configured to seal over a fastener head coupled to a building enclosure includes embossing or debossing an indicator on a top side of the film layer. A shape of the indicator may be selected from the group consisting of a plurality of circular rings mutually arranged into a larger circular ring pattern, an iris-type pattern resembling a focusing lens of a digital camera, a plurality of "plus" symbols generally arranged into a square shape, a plurality of at least partially overlapping circular rings arranged into a larger circular ring, a plurality of right-angle shapes arranged into two nested square shapes oriented at about 45 degrees relative to one another, a plurality of heptagonal shapes mutually arranged into a larger circular ring, a plurality of hexagons mutually arranged into three distinct honeycomb-type patterns, a plurality of hexagons mutually arranged into a honeycomb-type pattern, a plurality of hexagons and a plurality of squares arranged in an alternating pattern so as to define a larger circular ring shape, a flower-type shape defining a central ring and a plurality of flower-petal shapes extending radially outward therefrom, an interlocking plurality of hexagons, an abstract indicator pattern comprised of a plurality of elongated, irregularly shaped lines, an interlocking plurality of angled shapes, each angled shape defining an angle of about 120 degrees, a plurality of non-overlapping circular rings or dots, and a plurality of non-overlapping twelve-sided geometric shapes arranged and connected so as to define a plurality of squares and hexagons therebetween.

The disclosure also includes a method of sealing over a fastener head coupled to a building enclosure. In some examples, the method of sealing over a fastener head coupled to a building enclosure includes unwrapping a distal length of a release liner from a proximal roll of the release liner. According to some examples, the method of sealing over a fastener head coupled to a building enclosure peeling a circular fastener patch from the distal length of the release liner. The method of sealing over a fastener head coupled to a building enclosure may include referencing an indicator of the fastener patch to align the fastener patch overtop of the fastener head. In some examples, the method of sealing over a fastener head coupled to a building enclosure includes applying an adhesive layer of the fastener patch overtop of the fastener head. According to some examples, the method of sealing over a fastener head coupled to a building enclosure includes tearing the distal length of the release liner from the proximal roll.

The embodiments described above include many optional features and aspects. Features and aspects of the embodiments can be combined.

COMPONENT INDEX

100—Seal system
102—Roll
104—Fastener patch
106—Release liner
108—Exterior layer
110—Interior layer
112—Fastener
202—Film layer
204—Adhesive layer
206—Placement indicator
208—Indicator embossment line
210—Indicator debossment line
302—Diameter
600—Dispenser
602—Harness
700—Dispenser
702—Handle
800—Example technique

DETAILED DESCRIPTION

Homes, offices, and other buildings can include one or more exterior surfaces or enclosure layers to protect framed wall assemblies and interior structures (e.g., a wood frame) from weather damage and air leakage. For instance, enclosure layers often include cladding, rainscreen drainage space, exterior insulation, an Air and Water Barrier (AWB), sheathing, and the framed wall cavity. The sequence of these enclosure layers may vary by design preferences. Various examples of enclosure surfaces that serve as an AWB, or surfaces to which the AWB may be applied, include a sheathing panel, a structural insulation sheathing panel, a plywood panel, an oriented strand board (OSB) panel, a Magnesium-Oxide panel, an integrated Air-and-Water barrier panel, an integrated water-resistive sheathing panel, a sheet membrane, a building coating layer, a tape, a flashing, a coated or uncoated glass-mat facer, an insulation layer, a concrete surface, an above-grade wall, a below-grade wall, a roofing surface, or a fenestration element.

While the fastener seal system is primarily disclosed for use with fastener heads, it is understood that the benefits of protection against moisture and air could also be applied in use of such a product in tandem with any construction material that shares a resemblance or use case with a fastener, such as a rivet. As such, the prevention of air and water permeation may prevent rusting of these components.

For the purposes of readability, exterior layer 108 and interior layer 110 are used throughout this specification. It is understood that exterior layer 108 and interior layer 110 are components of the same enclosure substrate, and intended to display that the fastener patch 104 is penetrating into the interior of the enclosure surface. "Exterior layer 108" as used to describe the exterior of an enclosure surface is used interchangeably to mean the exterior surface of a substrate to which a fastener patch 104 is applied. "Interior layer 110" as used to describe the interior of an enclosure surface is used interchangeably to mean any portion of an enclosure surface that is not considered the exterior layer 108. As such, it is also implied that the fastener patch may penetrate multiple such enclosure surfaces. These enclosure surfaces include any of the previously disclosed surfaces including those enclosure surfaces that serve as an AWB, or surfaces to which the AWB may be applied, including a sheathing panel, a structural insulation sheathing panel, a plywood panel, an oriented strand board (OSB) panel, a Magnesium-Oxide panel, an integrated Air-and-Water barrier panel, an integrated water-resistive sheathing panel, a sheet membrane, a building coating layer, a tape, a flashing, a coated or uncoated glass-mat facer, an insulation layer, a concrete surface, an above-grade wall, a below-grade wall, a roofing surface, or a fenestration element.

Additionally, for the purposes of this disclosure, the terms "deboss" and "emboss," and all forms thereof, are intended to be read as interchangeable. While an embossment procedure will produce an embossment, and a debossment procedure will produce a debossment, no use of "deboss" or "emboss" is intended to be read as limiting, as it is understood that both procedures can be used to produce the same results.

Figure 1:
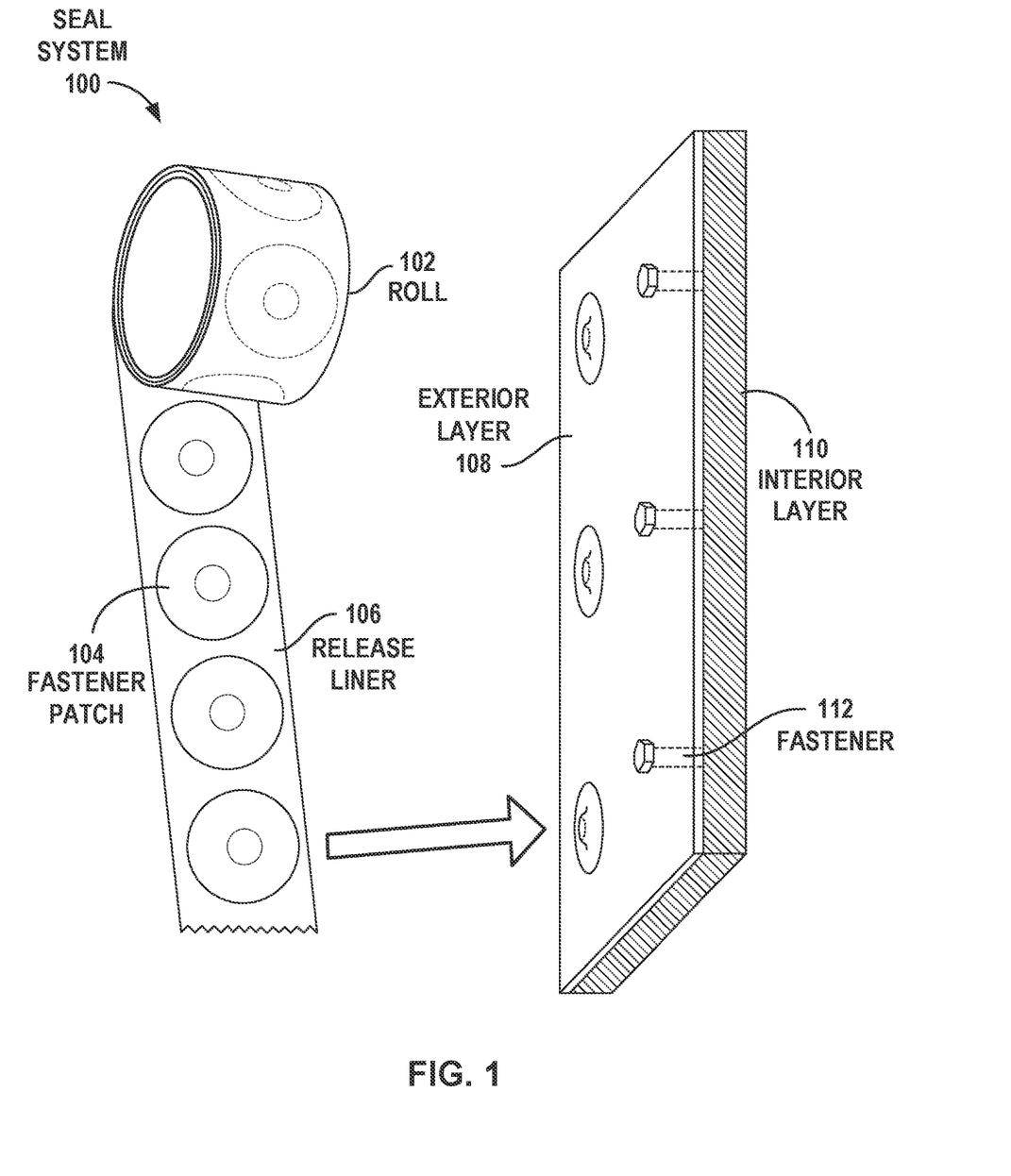
FIG. 1 is a diagram of an example fastener-seal system, including a cylindrical roll of discrete patches and an exemplary portion of a wall.

As illustrated in FIG. 1, during construction, an exterior enclosure layer (e.g., WRB) 108 is typically coupled to other enclosure components, framed assembly, and interior structure 110 via a plurality of fasteners 112, such as metal nails, tacks, screws, or the like. However, the perforation surrounding the head of each fastener 112 presents a breach in the Air and Water barrier, potentially allowing air and water to penetrate the interior structure 110 over time. Accordingly, the perimeter of these fasteners 112 requires an additional barrier element, as provided by the example fastener-seal system 100 shown in FIG. 1. System 100 includes a cylindrical roll 102 of discrete fastener patches 104 removably adhered to an elongated release liner 106. During construction, a builder can unwrap a length of release liner 106 from the roll 102 to expose one or more of the patches 104, and conveniently place the patches 104 overtop of the exposed fasteners 112 to seal the exterior layer 108.

Although patches 104 are illustrated as defining generally circular profiles in FIG. 1, patches 104 can have any suitable geometric shape, such as triangular, square, pentagonal, hexagonal, star-shaped, or an irregular shape, as just a few non-limiting examples.

Figure 2:
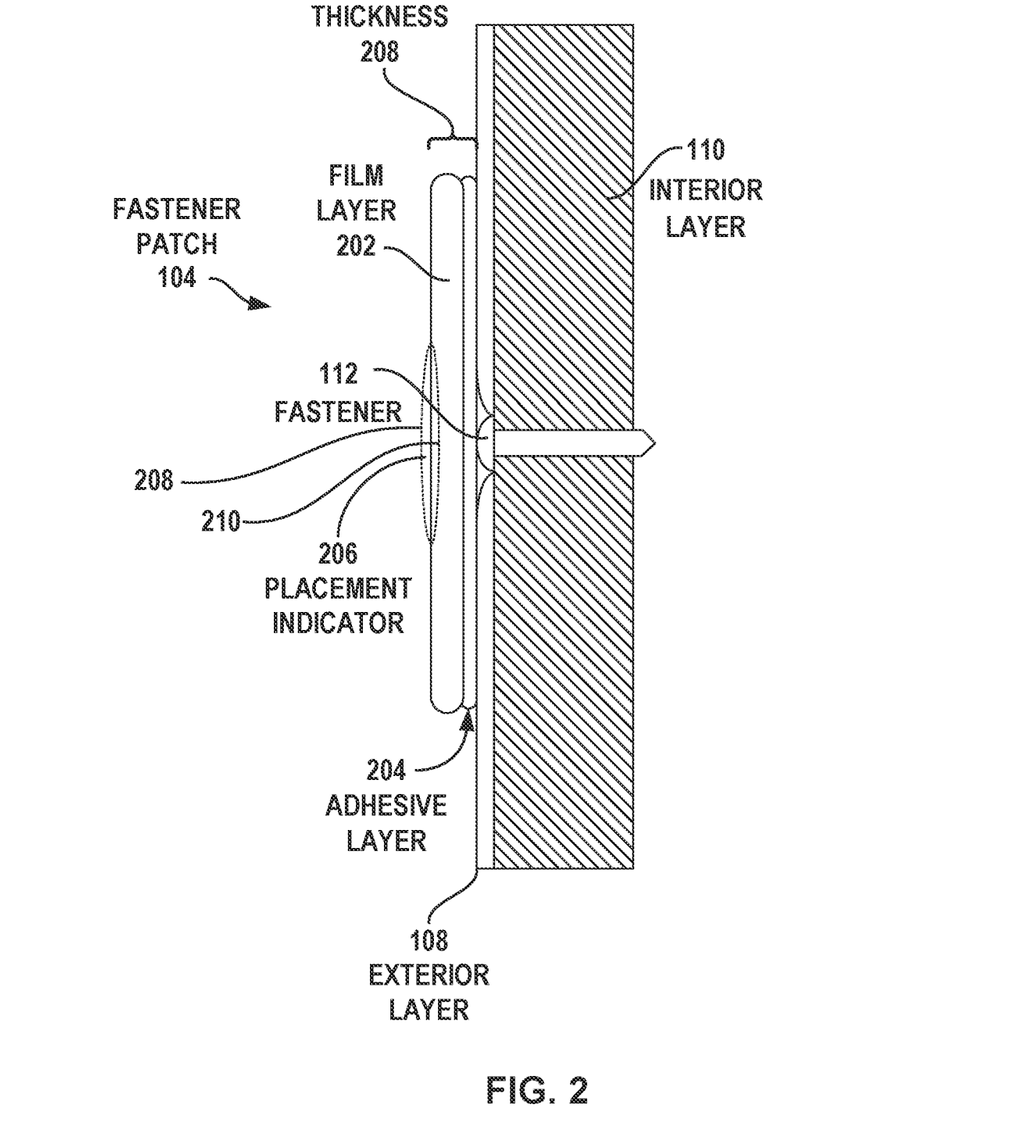
FIG. 2 is a side elevation view of the system of FIG. 1 along with an exemplary cross-sectional portion of a wall.

FIG. 2 is a side elevation view of the system of FIG. 1 along with an exemplary cross-sectional portion of a wall, and is not drawn to scale, for purposes of illustration. As shown in FIG. 2, each fastener patch 104 includes at least two fastener patch layers. These two fastener patch layers may be a compliant film layer 202 and an adhesive layer 204. In some examples, but not all examples, patch 104 further includes a placement indicator 206, as detailed further below.

In general, film layer 202 is an air-tight and water-tight film layer formed from a relatively conformable (e.g., flexible or pliable) material. In some examples, film layer 202 includes a topical or solid film. Film layer 202 may be selected to be coatable, e.g., formed from a material conducive to retaining an exterior coating layer, such as a liquid coating (e.g., acrylic, silicone, or a silane-modified polyether). As one example, film layer 202 may include, or may be, a fabric matrix, such as fleece or felt. In some examples, film layer 202 may include or may be a "hybrid" film, having coated and uncoated portions. In some examples, film layer 202 includes a high-density polypropylene, polyethylene, polyolefin, a polyethylene fabric fleece, a polyester fabric fleece, a combination of a solid and a fleece fabric, a polyethylene fabric felt, a polyester fabric felt, or a combination of a solid and a felt fabric. Additionally or alternatively, the film layer 202 may include fabric, fleece, or felt matrixes that are precoated with factory-applied coatings such as acrylics, silicones, and silane-modified polyethers. In still other examples, the fabric (fleece or felt) may be nested between two separate adhesive layers, such that the fabric is fully or at least partially embedded within the two adhesives. This may assist with preventing moisture translocation interstitially between the two adhesive layers, even under hydrostatic pressure. The fabric may offer structure that reduces creasing and distributed stresses in a more uniform manner.

In some examples, patch 104 is configured to self-seal in response to receiving a puncture. For instance, film layer 202 and/or adhesive layer 204 may be formed from a material configured to "re-flow" and solidify around a puncture to automatically re-seal the region. Materials used for the film layer 202 and/or adhesive layer 204 may be utilized that enable this "re-flow" process. Other materials that are known in the art to "self-seal" may additionally be used as a possible third fastener patch layer.

In general, adhesive layer 204 is a pressure-sensitive and hydrophobic adhesive layer disposed on an underside of film layer 202. As one non-limiting, illustrative example, adhesive layer 204 can include a styrene-isoprene-styrene (SIS) hot-melt, and acrylic, a butyl, or a butyl hybrid. This adhesive layer may be able to penetrate the gaps left between a fastener and the enclosure substrate through which the fastener is positioned, thus creating further protection from moisture or air permeation.

Figure 3:
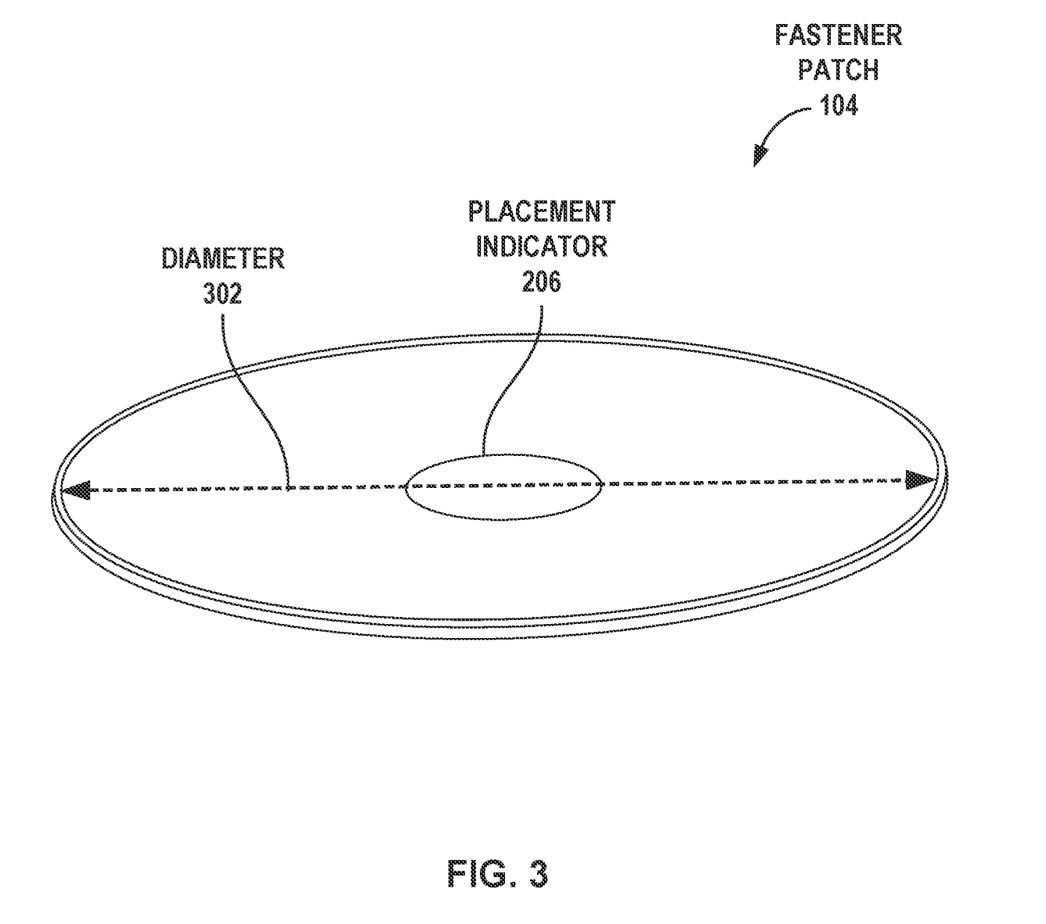
FIG. 3 is a profile view of an example patch of the system of FIG. 1, including some illustrative dimensions thereof.

As illustrated particularly in FIGS. 2 and 3, a unique advantage of the present disclosure is that patch 104 defines an outer circumferential edge defining a predetermined thickness 208 (e.g., the combined thicknesses of film layer 202 and adhesive layer 204). This predetermined thickness is configured to enhance tactile engagement to facilitate peeling of patch 104 from release liner 106 (FIG. 1). Accordingly, adhesive layer 204 may include a predetermined thickness, e.g., based on a type of building enclosure layer, based on a desired "peel strength", or both. As one non-limiting example, both a chemical composition and/or a thickness of adhesive layer 204 can be selected to define a minimum peel strength of about 10 pounds-per-inch.

Although not shown in FIG. 2, in some examples, but not all examples, patch 104 includes an additional thermal-insulation layer, such as a microsphere coating, a foam matrix, or an adhesive matrix having thermal conductivities significantly lower than the underlying fastener. The insulation layer may be localized to the fastener 112 head and the placement indicator 206, applied over the exterior film 202 as a separate and discrete layer, or it may be integral to the exterior surface film 202. In one particular example, patch 104 includes a "solid" film layer 202 with a first adhesive, and laminated to a separate fabric (e.g., fleece or felt) layer or another solid layer with a second adhesive. Such configurations may be particularly advantageous in creating a "slip" layer that aids in conforming around the head of fastener 112. The first solid film becomes the exterior face, adhesive and fleece (or felt) aid in conformability, then the final adhesive layer bonds to the substrate.

In some examples, placement indicator 206 can include an "embossment," e.g., a material layer embossed onto the outer surface of film layer 202. This embossment is seen as the dashed indicator embossment line 208. This process may allow for stress relief through the unique surface treatment of the embossment, which can relieve radial stress which is generally responsible for the failure of spot fastener treatments. That is to say, the embossment may be formed such as to relieve radial stresses that are formed by the raise fastener.

In some examples, placement indicator 206 can include a "debossment," e.g., in which an outer surface of film layer 202 is embossed, and wherein placement indicator 206 includes a de-bossed region removed from the embossed film layer 202. This debossment is seen as the dashed indicator debossment line 210. In other examples, as detailed further below, placement indicator 206 can include a predetermined pattern of both embossed and debossed portions.

FIG. 3 is a profile view of an example patch of the system of FIG. 1, including some illustrative dimensions thereof. In particular, FIG. 3 illustrates that patch 104 can define a predetermined width or diameter 302. Different examples of patch 104 can define different values of diameter 302 for specific applications, for instance, to cover different-sized fastener heads, or to adhere to different types of exterior surfaces 108 (FIG. 1). As just one illustrative example, a particular type of surface for exterior layer 108 that is less amenable to adhesion may require a larger-diameter patch, including a larger surface area of adhesive layer 204, to improve adhesion. For instance, according to the intended application, diameter 302 may be between about 0.5 inches and about 4 inches, or larger depending on the needs of the user or the size of the fastener head.

Figure 4:
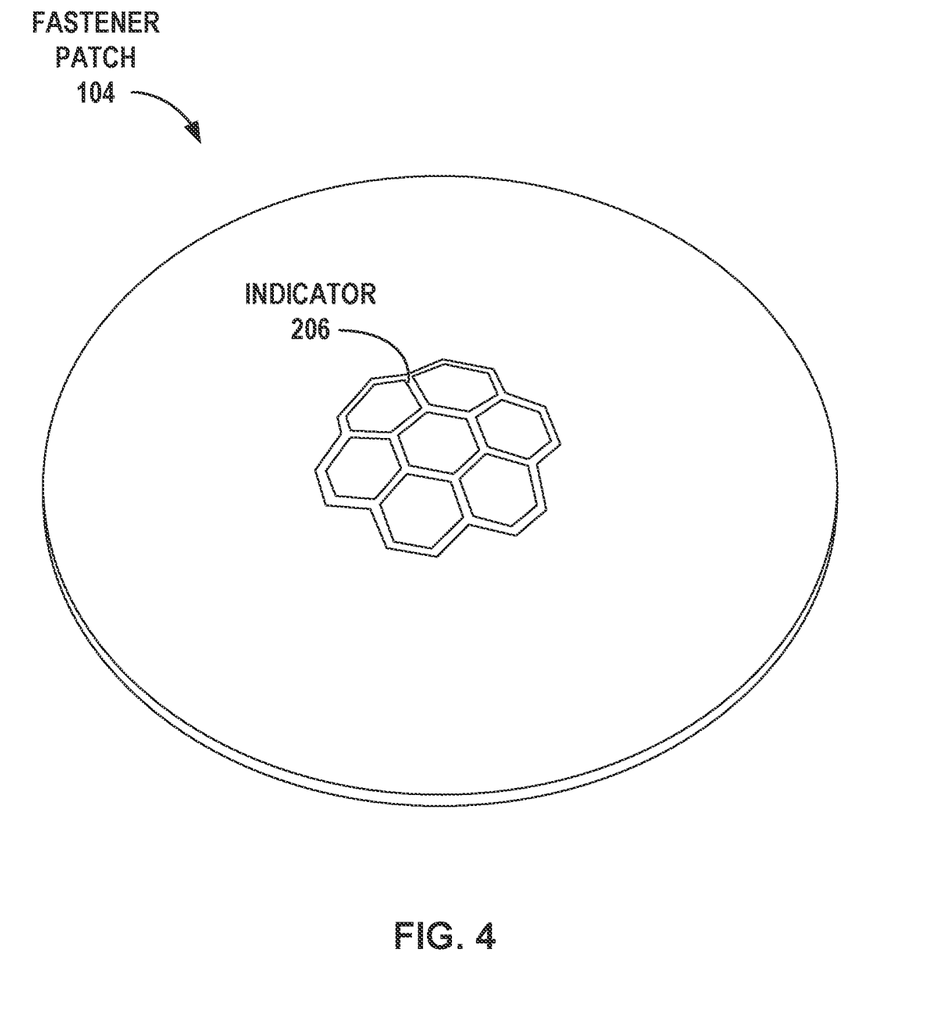
FIG. 4 is a profile view of another patch of the system of FIG. 1, including an example placement indicator.

FIG. 4 is a profile view of another patch of the system of FIG. 1, including an example placement indicator 206. Placement indicator 206 is configured to improve conformability around the fastener head and to provide visual feedback, tactile feedback, or both, in order to facilitate precise alignment of patch 104 relative to the head of fastener (FIG. 1). In the non-limiting example shown in FIG. 4, indicator 206 includes a honeycomb-type pattern of geometric hexagons. In a particular use case, the hexagons may be configured (e.g., shaped and sized) to substantially conform to a hexagonal shape of a head of fastener 112 (e.g., as shown in FIG. 1).

Figure 5A:
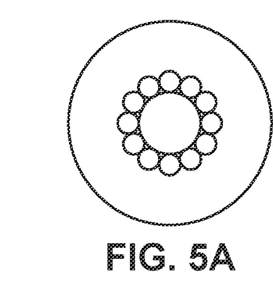
FIGS. 5A-5O are fifteen example configurations for the placement indicator and debossing patterns thereof of FIG. 4.
Figure 5B:
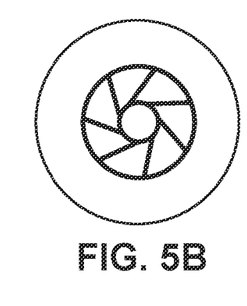
Figure 5C:
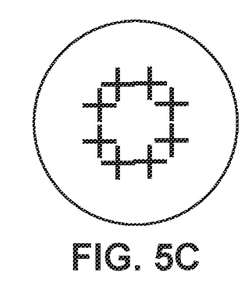
Figure 5D:
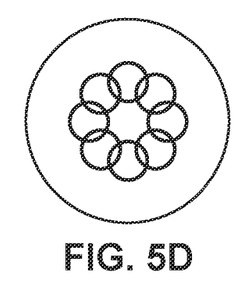
Figure 5E:
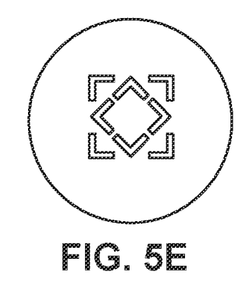

FIGS. 5A-5O are fifteen non-limiting, example configurations of placement indicator 206 (FIGS. 2-4). FIG. 5A shows an indicator pattern defining a plurality of circular rings mutually arranged into a larger circular ring pattern. FIG. 5B shows an iris-type pattern resembling a focusing lens of a digital camera. FIG. 5C shows a plurality of "plus" symbols generally arranged into a square shape. FIG. 5D shows a plurality of circular rings arranged into a larger circular ring (similar to FIG. 5A), except that adjacent rings are shown to be partially overlapping. FIG. 5E shows a plurality of right-angle shapes arranged into two nested square shapes oriented at 45 degrees relative to one another.

Figure 5F:
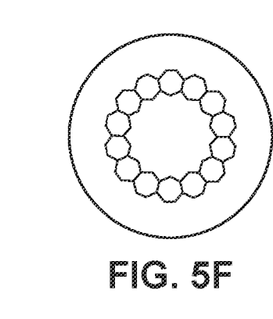
Figure 5G:
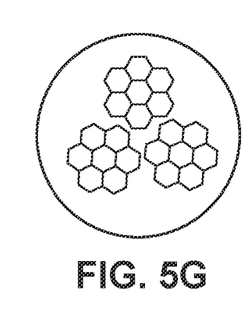
Figure 5H:
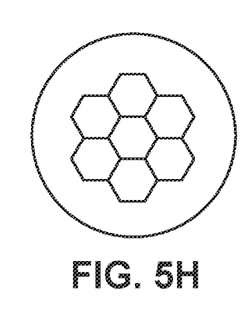
Figure 5I:
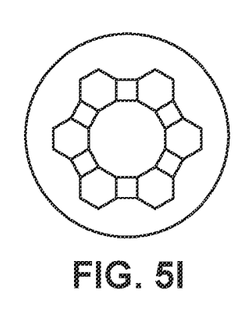
Figure 5J:
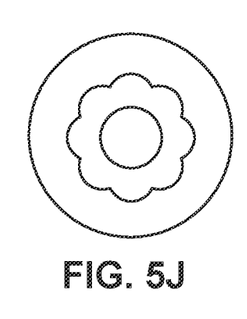

FIG. 5F shows a plurality of heptagonal (seven-sided) shapes mutually arranged into a larger circular ring. FIG. 5G shows a plurality of hexagons mutually arranged into three distinct honeycomb-type patterns, each honeycomb-type pattern similar to the example shown in FIG. 4. FIG. 5H shows a plurality of hexagons mutually arranged into a honeycomb-type pattern substantially similar to the example shown in FIG. 4. FIG. 5I shows a plurality of hexagons and a plurality of squares arranged in an alternating pattern so as to define a larger circular ring shape. FIG. 5J shows a flower-type shape defining a central ring and a plurality of flower-petal shapes extending radially outward therefrom.

Figure 5K:
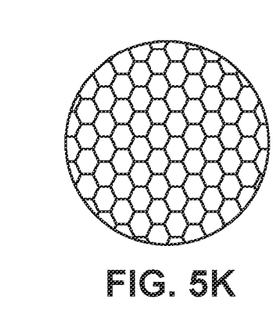
Figure 5L:
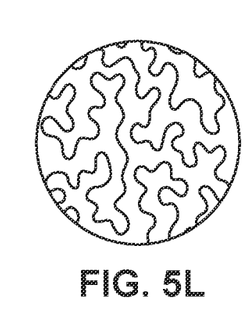
Figure 5M:
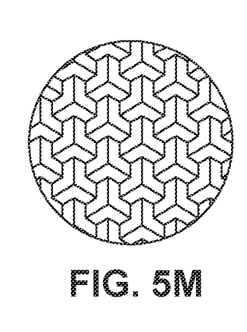
Figure 5N:
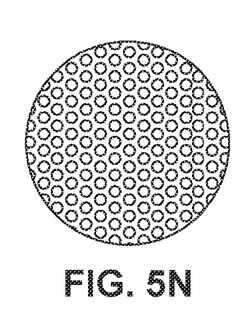
Figure 5O:
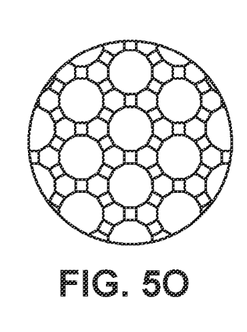

As compared to the examples shown in FIGS. 5A and 5J, each of which includes a spatially limited indicator pattern, the examples shown in FIGS. 5K-5O illustrate indicator patterns that extend across the entire exterior surface of film layer 202. For instance, FIG. 5K shows an indicator pattern comprised of an interlocking plurality of hexagons. FIG. 5L shows an abstract indicator pattern comprised of a plurality of elongated, irregularly shaped lines. FIG. 5M shows an indicator pattern comprised of an interlocking plurality of angled shapes, each angled shape defining an angle of about 120 degrees. FIG. 5N shows an indicator pattern comprised of a plurality of non-overlapping circular rings or dots. FIG. 5O shows an indicator pattern comprised of a plurality of non-overlapping twelve-sided geometric shapes arranged and connected so as to define a plurality of squares and hexagons therebetween.

Figure 6:
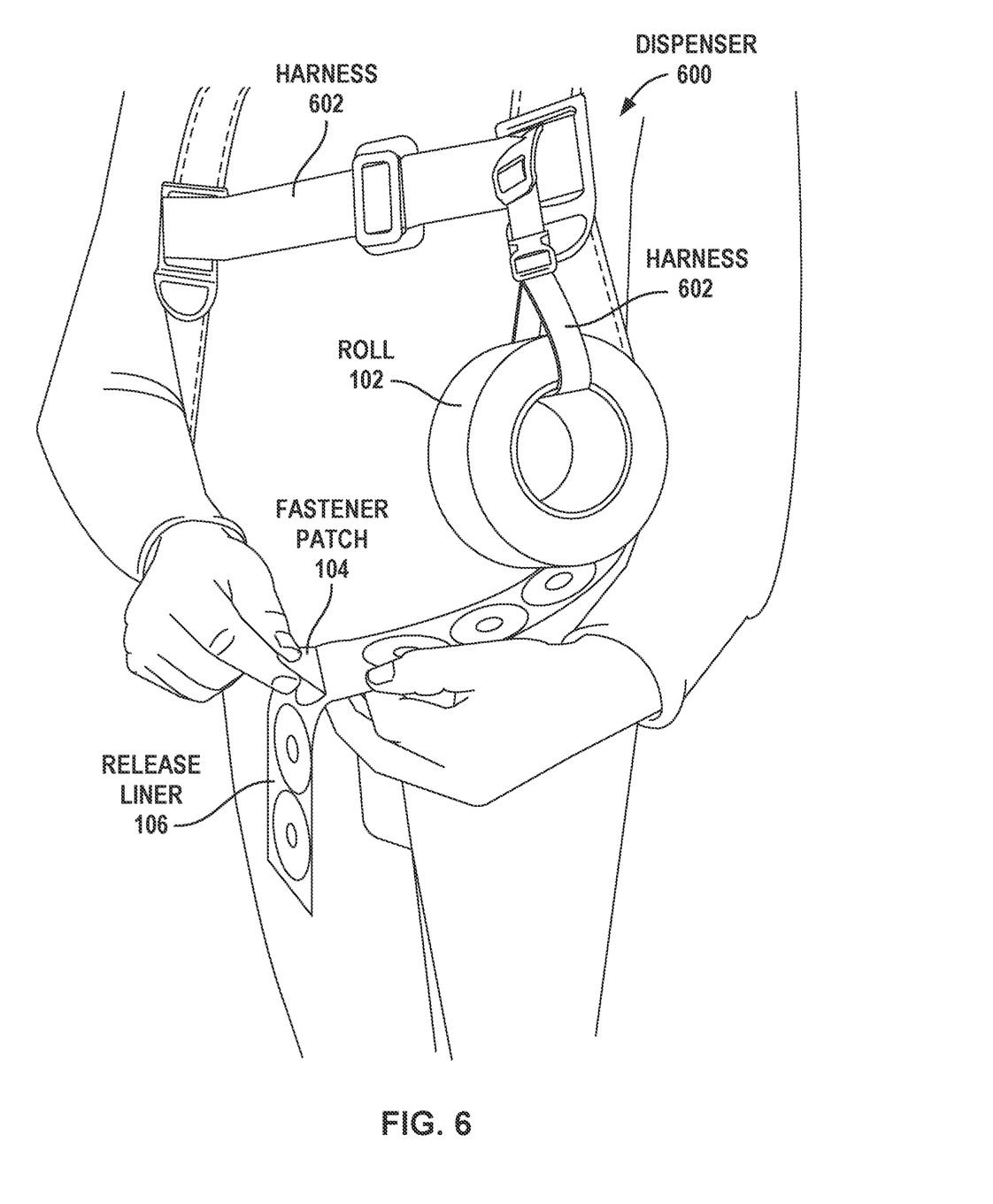
FIG. 6 shows a first example dispenser system for the fastener-seal system of FIG. 1.

FIG. 6 shows a first example dispenser system 600 for the fastener-seal system of FIG. 1. Dispenser system 600 includes a fabric harness 602 configured to be worn by a user (e.g., a builder). Fabric harness 602 includes a fabric loop 604 configured to loosely retain roll 102 such that the user may rotate roll 102 relative to loop 604 to extend a length of release liner 106 to expose one or more fastener patches 104.

Figure 7:
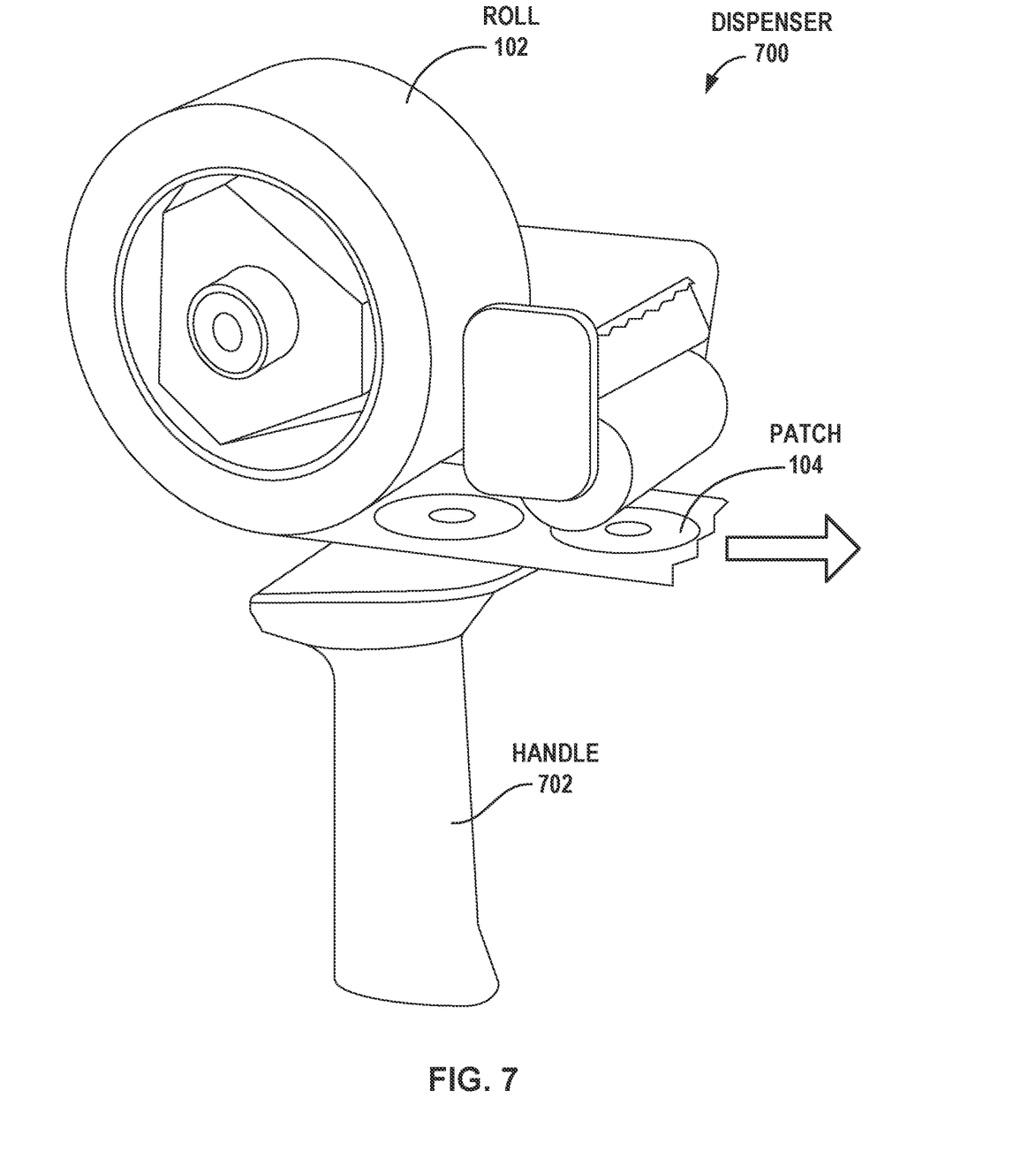
FIG. 7 shows a second example dispenser system for the fastener-seal system of FIG. 1.

FIG. 7 shows a second example dispenser system for the fastener-seal system of FIG. 1. Dispenser system 700 includes a handle 702 configured to be held by a user (e.g., a builder). The handle 702 includes a portion configured to receive the interior of the roll 102, such that the user may rotate roll 102 through either applying outside pressure to the roll 102, or through pulling on the portion of the roll 102 that is exiting through the front of the dispenser system 700. As can be seen at the front of the dispenser system 700, patches 104 are illustrated as facing up when exiting the dispenser system 700, indicating that when the roll 102 is in its coiled form, the patches 104 are facing the interior of the roll 102. By facing the patches 104 toward the interior of the roll 102, any present debossed indicators 206 (as shown and illustrated in FIGS. 4-5O) may be protected from damage. The user may rotate roll 102 to extend the length desired to expose one or more fastener patches 104.

Figure 8:
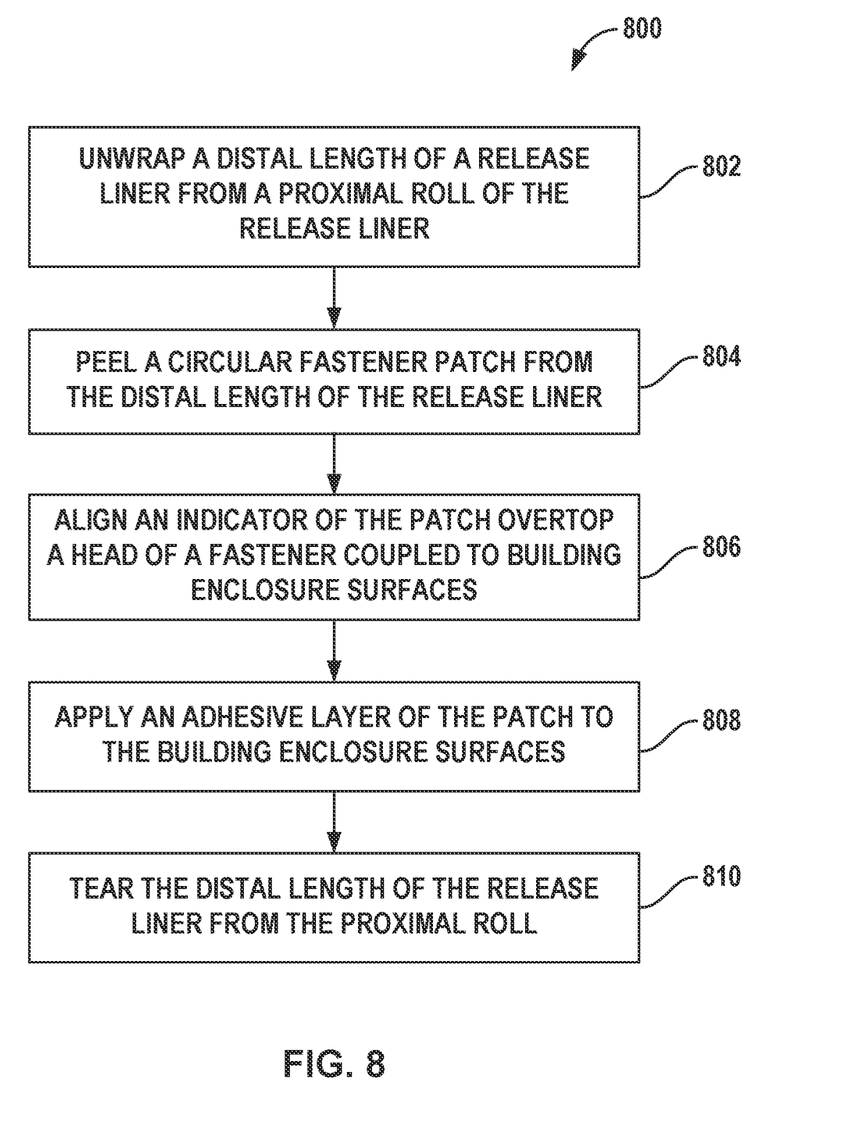
FIG. 8 is a flow diagram illustrating an example technique for using the fastener-seal system of FIG. 1.

FIG. 8 is a flow diagram illustrating an example technique 800 for using the fastener-seal system of FIG. 1. According to some examples, the technique 800 includes unwrapping a distal length of a release liner from a proximal roll of the release liner (at step 802). In some examples, the technique 800 includes peeling a circular fastener patch from the distal length of the release liner (at step 804). The technique 800 may include aligning an indicator of the patch overtop a head of a fastener coupled to building enclosure surfaces (at step 806). According to some examples, the technique 800 includes applying an adhesive layer of the patch to the building enclosure surfaces (at step 808). In some examples, the technique 800 includes tearing the distal length of the release liner from the proximal roll (at step 808).

INTERPRETATION

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A system for sealing over fastener heads coupled to one or more building enclosure layers, the system comprising:
   a release liner; and
   a plurality of fastener patches distributed along the release liner, each fastener patch comprising at least a first layer, a second layer, and a third layer,
      wherein the first layer comprises a conformable, airtight, and water-tight material,
      wherein the second layer comprises a pressure-sensitive and hydrophobic adhesive disposed between the first layer and the release liner,
      wherein the third layer comprises a thermally insulating material selected from the group consisting of a microsphere coating, a foam matrix, and an adhesive matrix, the third layer having a thermal conductivity significantly lower than an underlying fastener, and
      wherein the first layer is disposed between the third layer and the second layer.

2. The system of claim 1, wherein the first layer further comprises a film selected from the group consisting of a topical film, a solid film, and a coatable film.

3. The system of claim 2, wherein the coatable film comprises a fabric matrix configured to receive a liquid coating.

4. The system of claim 3, wherein the fabric matrix comprises a substance selected from the group consisting of a fleece and a felt, wherein the felt comprises a fiber selected from the group consisting of natural fibers and synthetic fibers.

5. The system of claim 3, wherein the coating is selected from the group consisting of acrylic, silicone, and silane-modified polyether.

6. The system of claim 1, wherein the first layer comprises a partially coated film.

7. The system of claim 1, wherein the first layer is selected from the group consisting of a high-density polypropylene, polyethylene, polyolefin, a polyethylene fabric, a polyester fabric, and a combination of a solid and a fleece.

8. The system of claim 1, wherein the first layer defines an outer-edge configured to facilitate tactile separation from the release liner.

9. The system of claim 1, wherein an outer surface of the patch comprises an indicator configured to facilitate positioning of the patch over the fastener head.

10. The system of claim 9, wherein the indicator comprises a debossment from the outer surface.

11. The system of claim 9, wherein the outer surface of the patch is debossed, and wherein the indicator comprises an embossment.

12. The system of claim 1, wherein the patch is configured to self-seal in response to receiving a puncture.

13. The system of claim 1, wherein the second layer defines a minimum peel strength of about 10 pounds-per-inch.

14. The system of claim 1, wherein the release liner is selected from the group consisting of a siliconized paper layer and a plastic film.

15. The system of claim 1, wherein the patch defines a width between about 0.5 inches and about 4 inches.

16. The system of claim 1, wherein the second layer comprises an adhesive selected from the group consisting of an acrylic, a hot melt, a butyl, and a butyl hybrid.

17. The system of claim 1, wherein the release liner comprises an elongated release liner.

18. The system of claim 17, wherein the elongated release liner is configured to be wrapped into a roll, and wherein a rotation of the roll exposes one or more fastener patches.

19. The system of claim 1, wherein each fastener patch comprises a circular fastener patch.

20. A system for sealing over fastener heads coupled to one or more building enclosure layers, the system comprising:
- a release liner; and
- a plurality of fastener patches distributed along the release liner, each fastener patch comprising a first layer, a second layer, and a third layer,
    - wherein the first layer comprises a conformable, airtight, and water-tight material,
    - wherein the second layer comprises a pressure-sensitive and hydrophobic adhesive disposed between the first layer and the release liner,
    - wherein the third layer comprises a thermally insulating material selected from the group consisting of a microsphere coating and a foam matrix, the third layer having a thermal conductivity significantly lower than an underlying fastener, and
    - wherein the first layer is disposed between the third layer and the second layer.

* * * * *